UNITED STATES PATENT OFFICE.

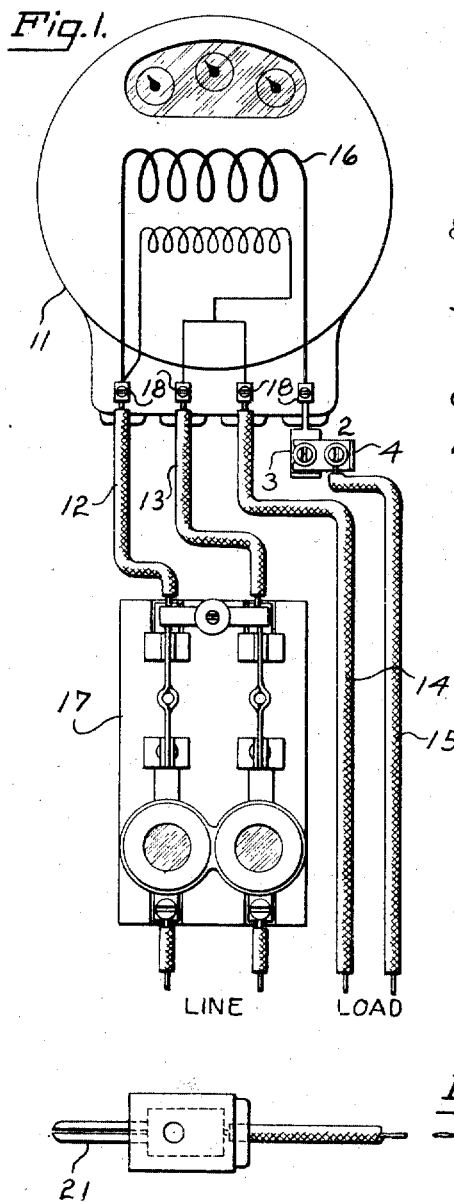

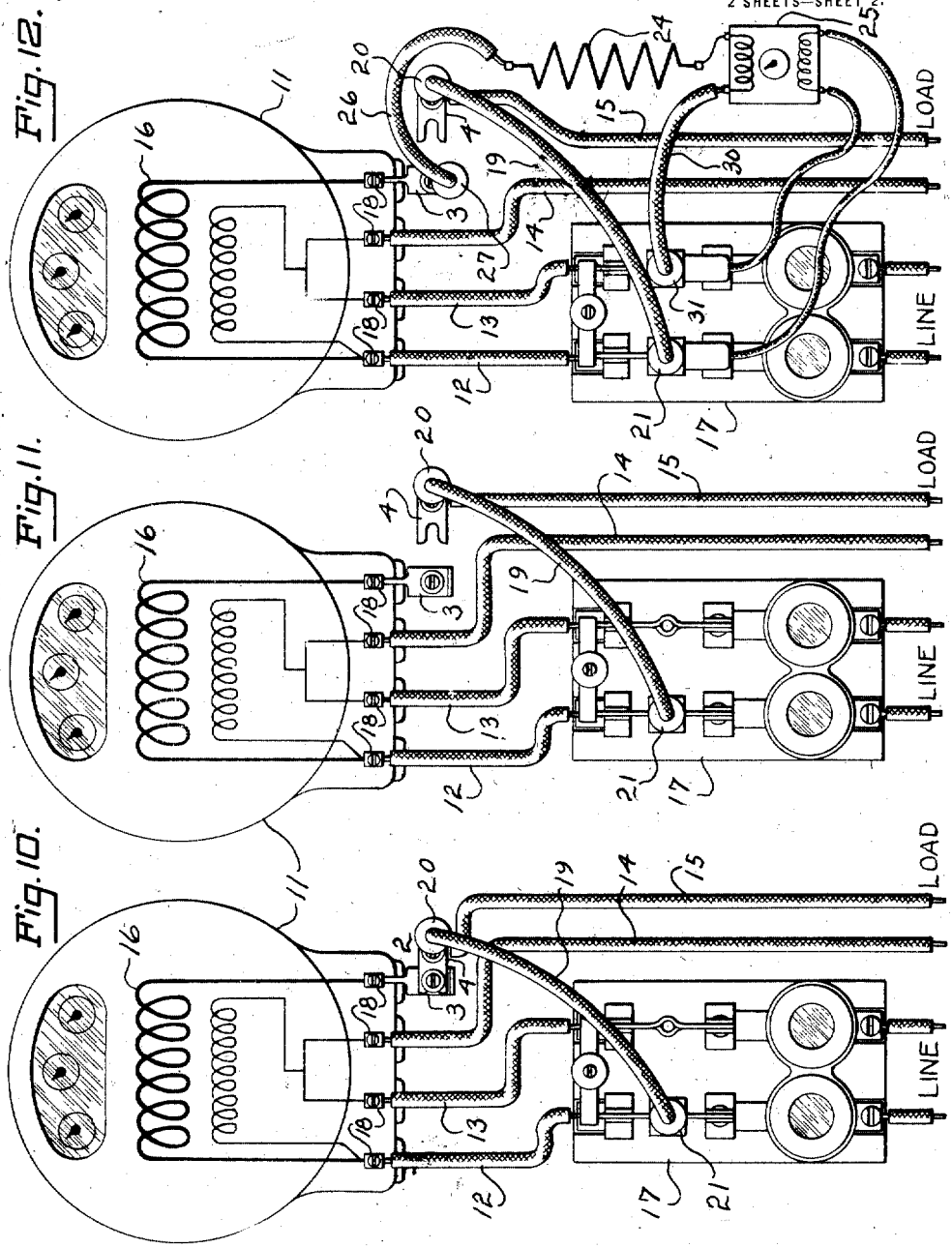

JOSEPH SACHS, OF HARTFORD, CONNECTICUT.

METER-TESTING APPURTENANCE.

1,245,038.  Specification of Letters Patent.  Patented Oct. 30, 1917.

Application filed November 17, 1916. Serial No. 131,877.

*To all whom it may concern:*

Be it known that I, JOSEPH SACHS, a citizen of the United States, residing at Hartford, in the county of Hartford and State of Connecticut, have invented certain new and useful Improvements in Meter-Testing Appurtenances, of which the following is a specification.

This invention relates to a meter testing appurtenance by which I can in a ready, quick and accurate and very inexpensive manner obtain a meter test. There are a large variety of embodiments of the apparatus which it is unnecessary for me to illustrate and describe. To comply with the statute I have shown one form of apparatus which has met my conditions in an eminently satisfactory manner. This I will set forth in detail in the following description. Obviously I am restricted in no sense to this particular disclosure; I may depart therefrom in radical respects within the scope of the invention defined by the claims following said description.

Referring to said drawings:

Figure 1 is a diagrammatic view of a meter installation including a form of meter testing appurtenance.

Fig. 2 is a front view of a meter testing appurtenance.

Fig. 3 is an end view of said appurtenance.

Figs. 4 and 5 are front views of the portions of said appurtenance separated.

Figs. 6 and 7 are end views of said portions separated.

Fig. 8 is a front view of a portion of the meter including a meter terminal and showing the appurtenance connected therewith.

Fig. 9 is a view of a testing by-pass partly in section.

Fig. 10 is a view of the meter installation of Fig. 1 with the by-pass in operative relation.

Fig. 11 is a similar view with the portions of the testing appurtenance separated.

Fig. 12 is a like view showing the connection of the meter in circuit with testing devices after the circuit has been by-passed around the meter and the connection between the circuit wire and the meter separated.

Like characters refer to like parts throughout the several views which are on different scales.

I provide a meter testing appurtenance which is susceptible of very inexpensive manufacture, which can be incorporated in a ready, quick manner in any meter installation and by which any of the well-known meter tests can be performed. This appurtenance in that particular form thereof which I have chosen to select for illustration in my drawings, comprises two portions or elements electrically connectible and disconnectible. In the present case the electrical connection is effected mechanically. One of these portions is adapted for connection with a meter terminal in such way that I can not only obtain the necessary electrical connection but can effect the necessary mechanical support of the appurtenance in its entirety. The other element or portion has provision for the connection therewith of a circuit wire (generally a load wire). The two portions as herein shown are each provided with means for the connection therewith of a testing device. For the purpose of carrying out the particular testing procedure as illustrated in Figs. 10 to 12 inclusive the circuit wire connected portion receives or connects with a testing by-pass whereby the circuit is passed around the meter while the portion connected with the meter terminal receives a testing device serving to include in circuit with the meter the testing instruments. While there is certainly an element of advantage in providing a sectional appurtenance such as that I have briefly described, I am in no sense limited thereto as the invention is broader than this, as will be gathered from an inspection of my claims. While in the particular test procedure and for the performance of the particular test shown in Figs. 10 to 12 inclusive a by-pass is electrically connected to one of the portions, while the testing instruments are electrically connected with the meter terminal through (in this instance) the other portion of the appurtenance, it will be clear that for the performance of other tests the appurtenance may be otherwise connected, as for instance instead of using a by-pass to jump around the meter and then include the meter in a separate testing circuit with separate testing instruments and testing load as is illustrated in said views, the testing meter alone may be connected directly in circuit with the installed meter and load by connecting the terminals from the testing meter respectively to each of the two portions of the appurtenance already referred to.

Referring now more in detail to Figs. 2 to 7 inclusive wherein I represent the appurtenance in assembled and separated relation. For convenience this appurtenance will be denoted in a general way by 2. As illustrated said appurtenance comprises two portions, members or elements as 3 and 4 respectively. The portion or element 3 is made or may be made from sheet metal, such as brass or copper. As represented it comprises a body from which there extends a tongue 5 which may as shown be in the plane of the body. The body of said element 3 is provided with suitable means for the connection therewith of a testing appliance and the offstanding flange or blade 6 at the outer end of the body answers satisfactorily in this particular, this blade or flange being adapted to be straddled by a clip terminal of such a testing appliance, or it may be otherwise connected therewith. As will be clear, this is merely one of several ways by which the necessary connection with the portion 3 or its equivalent can be made. The portion 4 as will hereinafter appear is adapted for connection with a circuit wire, and I will set forth a simple way of several by which this particular result can be obtained. In addition to the fact that a circuit wire (which may be either a load wire as shown or otherwise) is connected to the portion or member 4 or analogous element, there is provision for the connection therewith of a testing device which in the test shown is a by-pass or jumper. This by-pass or jumper may be electrically (and mechanically) connected with the part 4 or its equivalent in any desirable manner. For instance and as shown, said part 4 may be furnished with an offstanding blade or flange as 7 to receive a clip terminal of the by-pass or jumper or other testing instrumentality. The two portions of the appurtenance may be mechanically and electrically connected for mechanical and electrical disconnection when occasion arises therefor in any suitable manner. The means illustrated for this purpose answers, and I will now set forth the same. The inner end of the portion or element 4 has a slot 8 which as shown is open at one end. This slotted part of the portion 4 fits flatwise against the body of the portion 3 as illustrated for instance in both Figs. 2 and 3, the two portions being held assembled by the screw 9 tapped into the body of the part 3 and the head of which clamps the slotted part of the portion 4 against the body of the portion 3. The slot being open, it becomes a simple matter to separate mechanically and electrically the two portions 3 and 4. This is accomplished by slightly backing out the screw 9 when the desired electrical separation of the two parts 3 and 4 can be obtained. The point to be effected by my invention is to provide an arrangement whereby a testing device can be connected therewith, and the installed meter connected with suitable testing instruments without interrupting the current supply from the supply wires to the load wires whether such current supply is by-passed around the meter by a by-pass as shown and the meter tested in a separate testing circuit or whether the installed meter is always included in the supply circuit and the testing meter inserted in said circuit or by any other arrangement of connections. In the form of my meter testing appurtenance herein illustrated, I have shown a meter connectible portion and a circuit wire connectible portion, the two portions being mechanically separable in order to effect their electrical disconnection for the purpose stated. It will, however, be clear that there are various ways of accomplishing the electrical separation desired without mechanically moving the two portions one from the other. The circuit wire connectible portion 4 is provided with means of some convenient nature for the connection therewith of a circuit wire. The screw 10 is shown for this purpose, being threaded into the body of the part 4 and the head of the screw 10 serving to clamp the wire to said body.

Usually a meter installation comprises the installed meter, of which that denoted by 11 is an example, and the service or supply wires like 12 and 13 and load wires as 14 and 15. In the particular meter installation a two wire meter is used, which form of meter usually has a single current coil denoted by 16. On the service or supply side of the meter there is usually connected some form of service side appliance, the appliance here shown consisting of a cut out switch 17. At times, however, the meter installation may be of radically different arrangement. In the showing herein I simply illustrate a service side appliance for the purpose of indicating some form of service side connected appliance or connection for obtaining proper service side connection in making certain tests where for instance the by-pass or jumper testing device is used.

In Fig. 8 I have shown a portion of the terminal chamber of the meter including one of the connecting terminals 18 of the meter. The meter testing appurtenance of my invention is shown electrically connected to and mechanically supported by said terminal 18. In the particular meter installation illustrated in Fig. 1 and under testing conditions in Figs. 10 to 12 inclusive, I have used a single meter testing appurtenance associated with only one of the meter terminals. It will be clear, however, that I may employ more than one. For instance, I may have such an appurtenance in association with a load side meter terminal and another appurtenance in association with a service side meter terminal, both of which may be in the same leg of the circuit or in different legs. As I have already stated, the testing procedure illustrated in Figs. 10 and 12 arranges the connections for the performance of a certain test in which particular test the circuit is jumped or by-passed around the meter from the service to the load side circuit wires, while the meter previously included under normal conditions between these two points or at least the current coil of the meter is now disconnected from its prior load side connection and included in a separate testing circuit having the testing instruments and load. It is well understood, however, that there are various other forms of tests which it may be desired to perform in connection with the particular meter installation illustrated in Fig. 1; for instance as has already been stated instead of including the meter or its current coil in a separate testing circuit and by-passing around the meter from the service to the load circuit wires, it may be desired to connect directly in series with the installed meter and load the testing meter. My testing appurtenance is adapted for the performance of either form of test, or any other. Where the test is to be made by by-passing or jumping around the installed meter, then it is desirable to use a testing jumper or by-pass as 19 fitted with clip terminal 20 at one end for the association and electrical connection with the blade 7 of the portion 4 or any other similar or equivalent part of my appurtenance. The other terminal 21 of the by-pass may be of any desired form for the connection of this terminal with the service side appliance. In the organization shown in Fig. 1 the load wire 15 is connected with the appurtenance portion 4. Consequently that particular leg of the circuit includes the service circuit wire 12, the current coil 16 of the meter, the meter testing appurtenance 2 and the load circuit wire 15.

In making the particular form of test illustrated in Figs. 10 to 12, the following procedure may be adopted: The testing by-pass 19 is first connected across from the load circuit wire connected portion 4 to the service side appliance 17 as shown in Fig. 10 so that the meter coil 16 is now shunted or by-passed. Ordinarily although a different procedure may be used, the two portions of the testing appurtenance are now separated in the manner already described, and the load circuit wire connected portion 4 is bodily moved away from the meter terminal connected portion 3, thus breaking the electrical connection between the meter terminal and the load wire but without interruption of the circuit from the service to the load circuit wires, which is maintained through the by-pass. This separation by bodily moving the portion 4 and its connected circuit wire 15 is represented in Fig. 11. To now test the meter, it is necessary to put the coil 16 in circuit with certain testing instruments which usually include a resistance testing load 24 and a standard meter testing meter 25. The testing lead or cable 26 serves as one terminal of the testing instruments and is fitted with the terminal 27 which may be like the clip 20 of the by-pass 9 to be engaged in straddling connection with the blade 6. The cable 30 from the other end of the testing instruments is then connected to the other leg of the circuit ahead of the meter as indicated at 31. Connections from the potential coil of the standard meter may be made in the well-known manner as indicated in Fig. 12. After the test has been made, the terminal 27 may be disconnected from the blade 6 and the two portions of the testing appurtenance may be connected together electrically and mechanically after which the by-pass may be removed and the current then again passing from the service to the load side through the meter coil 16 as shown in Fig. 1.

What I claim is:

1. A meter testing appurtenance comprising two detachably connected elements, each having provision for the connection therewith of a testing appliance, and one of them being provided with means for the connection of said appurtenance with a meter, and the other having means for the connection therewith of a circuit wire.

2. A meter testing appurtenance comprising two detachably-connected elements, one of which is provided with means for its electrical connection to and support by a meter terminal, the other being provided with means for the connection therewith of a circuit wire, each of said elements being also provided with means for the connection therewith of a testing appliance.

3. A meter testing appurtenance adapted to be electrically connected to and mechanically supported by a meter terminal, comprising two detachably-connected elements, each of which is provided with means for receiving a meter-testing device, said appurtenance being provided with means for the connection therewith of a circuit wire and also with means for the electrical disconnection of the two elements of said appurtenance while maintaining said circuit connection and said testing device connection.

4. A meter testing appurtenance comprising at least two portions and provided with means for its electrical connection to and support by a meter terminal and also with means for connection with a circuit wire, means for receiving a testing device, and means for electrically opening the connection between the circuit wire connectible end and the meter terminal connectible end of said appurtenance while maintaining the testing device connection with said appurtenance, a portion of said appurtenance being at all times supported and remaining in connection with said meter terminal.

5. A meter testing terminal provided with means for its connection to a circuit wire and also for its electrical connection to a meter terminal, said meter testing terminal being provided with means for receiving a testing device and also with means for electrically breaking the connection between said circuit wire and said meter terminal while maintaining the connection with the testing device and also provided with means for the connection of an additional testing device after the aforesaid electrical connection between the circuit wire and the meter terminal has been open.

6. A meter testing terminal provided with means for its connection to a circuit wire and means electrically connectible to a meter terminal, said meter testing terminal being also provided with means for receiving a testing device, and with means for closing or opening the connection between the circuit wire and the meter terminal while the testing device is connected with said meter testing terminal, the means connectible to the meter terminal being at all times supported by and in electrical connection with said meter terminal.

7. In an electrical service installation, the combination of a meter, a service side appliance and wire and a load side circuit wire, with a testing appurtenance electrically interposed between said load side circuit wire and the load side of said meter, and having a part at all times supported by and remaining in electrical connection with the meter, said meter testing appurtenance being provided with means for receiving a testing device for electrically connecting across from said load side circuit wire to said service side appliance, and means associated with said meter testing appurtenance to permit the electrical disconnection of said circuit wire from the load side of said meter while maintaining its electrical connection with said service side appliance through said testing device and for also permitting the reconnection of said load side circuit wire while said testing device is in operative relation.

8. The combination of an electric meter including a current coil and its service and load side connections, of a meter-testing appurtenance electrically interposed between a load side connection and a circuit wire, said meter testing appurtenance having a part at all times supported by and remaining in electrical connection with the meter, said appurtenance being provided with means for by-passing the circuit around said meter coil and for opening the circuit through said coil while maintaining said by-pass.

9. A terminal comprising two electrically separable parts, for connecting a circuit wire to a meter terminal and provided with means whereby the current supply to said circuit wire passes through or around the meter as desired, said terminal having means whereby that part connected with the meter terminal is at all times supported thereby and in electrical connection therewith.

10. A circuit wire terminal having a part connectible to a meter terminal, said part having means for maintaining it at all times in connection with the meter, said circuit wire terminal being provided with means for the connection therewith of a by-pass device and also for the connection therewith of a circuit wire, said terminal being manipulable while the by-pass connection and the circuit wire are connected therewith.

11. A meter testing appurtenance comprising a metallic body formed at one portion to at all times coact electrically and mechanically with a meter terminal and at another portion provided with means for electrical and mechanical connection with a circuit wire, said appurtenance being provided with means to at all times receive a testing appurtenance and adapted when said testing device is connected to permit of the electrical disconnection of said circuit wire from said meter terminal.

12. In a meter testing appurtenance, a circuit wire connectible portion and a meter terminal connectible portion, means for holding said portions in electrical and mechanical association, means for by-passing the circuit from the circuit wire connectible portion around the meter, means for connecting a testing device to the meter connectible portion, said means for holding the two portions in electrical and mechanical association being also adapted to permit separating said portions for thus opening the circuit through said meter after the circuit has been by-passed around said meter from said circuit wire.

13. A meter testing appurtenance comprising two electrically connected portions, one of which is adatped for connection to a circuit wire and the other being at all times connected to and supported by a meter terminal and each of which is provided with means for the connection thereto of a testing device, said appurtenance being provided with means whereby said two portions may be electrically separated when said testing devices are connected.

14. A meter testing appurtenance comprising two electrically and mechanically associated portions, each of which is provided with means for receiving a testing device at any time, one of said portions being connectible to a circuit wire and the other being electrically connectible and supportable by a meter terminal, said portions being electrically separable when said testing devices are connected.

In testimony whereof I affix my signature in the presence of two witnesses.

JOSEPH SACHS.

Witnesses:
L. L. MARKEL,
HEATH SUTHERLAND.